United States Patent [19]

Riordan et al.

[11] Patent Number: 4,687,898

[45] Date of Patent: Aug. 18, 1987

[54] METHOD OF FUSING WIRE TO A TERMINAL

[75] Inventors: Edward D. Riordan, S. Somerville; Allan Warner, Clark, both of N.J.

[73] Assignee: Joyal Products, Inc., Linden, N.J.

[21] Appl. No.: 808,530

[22] Filed: Dec. 13, 1985

[51] Int. Cl.[4] .............................................. B23K 11/32
[52] U.S. Cl. .................................. 219/56.22; 219/56.1
[58] Field of Search ................. 219/56.1, 56.21, 56.22, 219/91.2, 118; 228/4.5; 339/278 T

[56] References Cited

U.S. PATENT DOCUMENTS 4,211,913  7/1980  Camardella ...................... 219/56.22
4,510,370  4/1985  Szantho ............................ 219/86.25
4,558,200 12/1985  Weigand, Jr. ................. 219/56.22 X

FOREIGN PATENT DOCUMENTS 8178  4/1979  Japan ................................. 219/56.22

Primary Examiner—E. A. Goldberg
Assistant Examiner—C. M. Sigda
Attorney, Agent, or Firm—Lerner, David, Littenberg, Krumholz & Mentlik

[57] ABSTRACT

A terminal pin of a coil bobbin has opposed sets of notches sized, shaped and spaced so as to permit magnet wire to be wrapped around the terminal pin in a spiral path defined by the notches. Because the magnet wire is received in the notches, the notches function to properly locate the wire on the pin and to maintain the wire stationary. The notches have a depth selected so that the portions of the magnet wire received in the notches are recessed below an outer surface of the pin, whereby electrodes used to fuse the magnet wire to the pin are allowed to contact the pin and thereby form a closed circuit. The resulting heat melts the insulation on the magnet wire to permit the fusing of the wire to the pin.

12 Claims, 6 Drawing Figures

METHOD OF FUSING WIRE TO A TERMINAL

FIELD OF THE INVENTION

The present invention relates to terminal pins, and, more particularly, to such pins which are adapted for use in connection with coil bobbins.

BACKGROUND OF THE INVENTION

Coil bobbins typically include a plastic core and a pair of plastic flanges arranged at opposite ends of the core. Terminal pins, which are usually made from tinned brass, extend outwardly from one flange or both flanges of the bobbin. One end of a piece of magnet wire is wrapped around one of the terminal pins. After wrapping the bulk of the magnet wire around the core of the bobbin, the other end of the magnet wire is wrapped around another terminal pin.

The terminal pins are adapted for insertion into holes in, for instance, a printed circuit board. Prior to inserting the pins into the holes of the printed circuit board, the magnet wire must be permanently attached to the pins. In the past, such attachment was accomplished by inserting the pins into a solder bath. The solder bath technique is disadvantageous because the heat generated by the bath can cause the plastic flanges of the bobbin to melt, thereby loosening the terminal pins. Also, when the soldered terminal pins are resoldered during their attachment to the printed circuit board, the heat generated during such resoldering could loosen the already soldered magnet wire.

Fusing is an alternate to soldering. Fusing the wire magnet to the terminal is, however, difficult because the insulation on the wire prevents electrodes used in the fusing operation from making a closed circuit. thus, in order to fuse the magnet wire to the terminal pins, the insulation must first be stripped off of the magnet wire. Such a stripping operation is tedious and time consuming. Also, because the magnet wire is directly contacted by the electrodes, the wire is carrying capability can be impaired to an extent sufficient to cause the wire to break, thereby completely destroying the current carrying capability of the wire.

SUMMARY OF THE PRESENT INVENTION

The problems and disadvantages discussed above are overcome in accordance with the present invention by constructing a terminal pin of a coil bobbin such that portions of a piece of magnet wire wrapped around the pin in a spiral path are recessed below an outer surface of the pin, whereby electrodes used to fuse the magnet wire to the pin are allowed to contact the pin and thereby form a closed circuit. The resulting heat melts the insulation on the magnet wire to permit the fusing of the wire to the pin.

In one embodiment, the terminal pin has opposed sets of notches which are sized, shaped and spaced so as to receive the recessed portions of the piece of magnet wire. Because the magnet wire is received in the notches, the notches also function to properly locate the wire on the pin and to maintain the wire stationary. By notching two opposed corners of the pin only, the unnotched corners remain sharp and therefore cooperate to inhibit the magnet wire from rotating about the pin. Moreover, by arranging each pin such that the diagonal connecting the two notched corners is parallel to a core of the bobbin (i.e., transverse of an associated flange), the notched corners of the pin are made more accessible to electrodes used to fuse the magnet wire to the pin.

BRIEF DESCRIPTION OF THE DRAWINGS

For a more complete understanding of the present invention, reference is made to the following detailed description of an exemplary embodiment considered in conjunction with the accompanying drawings, in which.

DESCRIPTION OF THE EXEMPLARY EMBODIMENT

Figure 1:
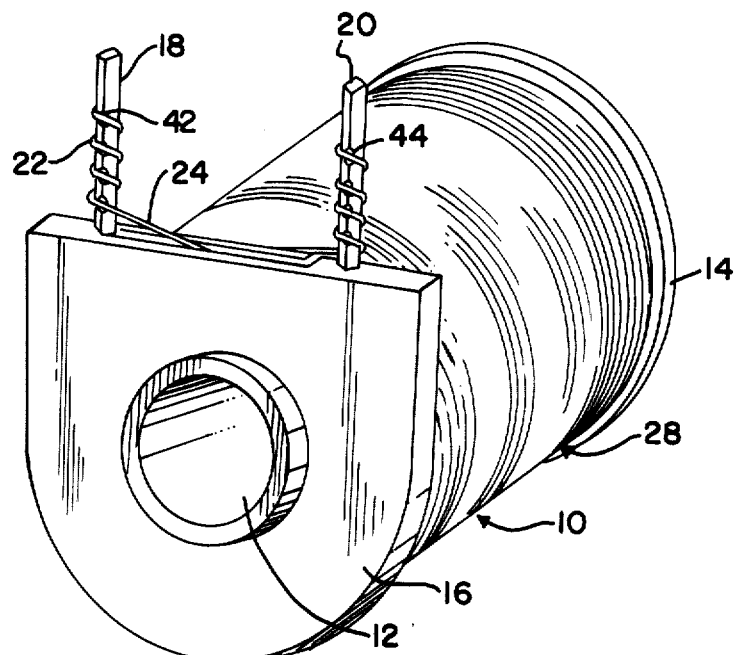
FIG. 1 is a perspective view of a coil bobbin constructed in accordance with the present invention.
Figure 2:
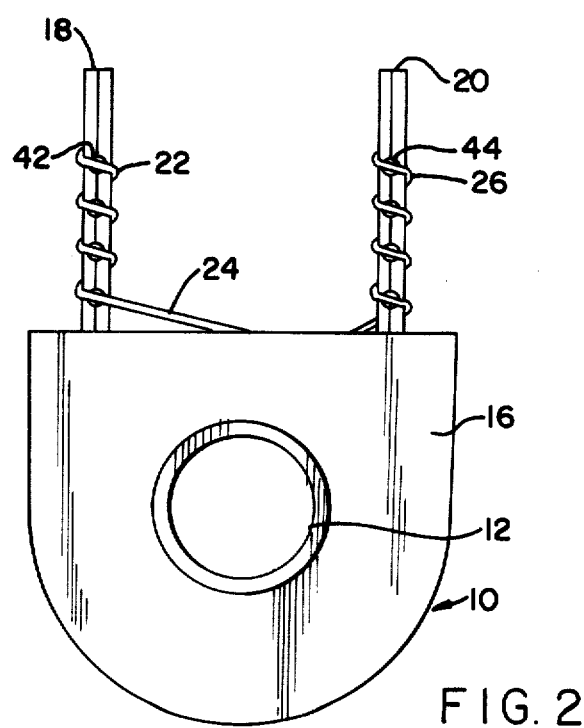
FIG. 2 is a front elevational view of the coil bobbin illustrated in FIG. 1.

Referring to FIGS. 1 and 2, there is shown a plastic coil bobbin 10 which includes a core 12, a circular flange 14 arranged at one end of the core 12 and a semicircular flange 16 arranged at an opposite end of the core 12. As shown in FIG. 1, semicircular flange 16 is generally planar. Terminal pins 18, 20, which are preferably made from tinned brass, extend outwardly from the flange 16. One end 22 of a piece of magnet wire 24 is wrapped around the terminal pin 18, while an opposite end 26 of the magnet wire 24 is wrapped around the terminal pin 20. The remainder of the magnet wire 24 is wrapped around the coil 12 of the bobbin 10 to form a coil 28.

Terminal pins 18, 20, which have a square transverse cross-sectional shape, are adapted for insertion into holes in, for instance, a printed circuit board (not shown). In order to facilitate the attachment of the magnet wire 24 to the terminal pins 18, 20, corners 30, 32 of the pins 18, 20, respectively, are provided with notches 34, 36, respectively, while corners 38, 40 of the pins 18, 20, respectively are provided with notches 42, 44, respectively (see FIG. 3).

The notches 34, 42 in the terminal pin 18 are sized, shaped and spaced so as to permit the end 22 of the magnet wire 24 to be wrapped around the pin 18 in a spiral path defined by the notches 34, 42, which function to properly locate the end 22 of the magnet wire 24 on the pin 18 and to maintain the end 22 of the magnet wire 24 stationary. Unnotched corners 46, 48 of the terminal pin 18 are sharp and therefore cooperate to inhibit the end 22 of the magent wire 24 from rotating about the pin 18. The notches 34, 42 have a depth selected so that the portions of the magnet wire 24 received in the notches 34, 42 are recessed below the outer surface of the terminal pin 18, whereby a ground electrode 50 and a fusing electrode 52 (see FIG. 3) used to fuse the end 22 of the magnet wire 24 to the terminal pin 18 are allowed to contact the pin 18 and thereby form a closed circuit. By arranging the terminal pin 18 such that the diagonal connecting the corners 30, 38 is parallel to the core 12 of the bobbin 10 (i.e., perpendicular to the plane of the flange 16), the corners 30, 38 are made more accessible to the electrodes 50, 52.

The notches 36, 44 in the terminal pin 20 are sized, shaped and spaced so as to permit the end 26 of magnet wire 24 to be wrapped around the pin 20 in the spiral path defined by the notches 36, 44, which function to properly locate the end 26 of the magnet wire 24 on the pin 20 and to maintain the end 26 of the magnet wire 24 stationary. Unnotched corners 54, 56 of the terminal pin 20 are sharp and therefore cooperate to inhibit the end 26 of the magnet wire 24 from rotating about the pin 20. The notches 36, 44 have a depth selected so that the portions of the magnet wire 24 received in the notches 36, 44 are recessed below the outer surface of the terminal pin 20, whereby the ground electrode 50 and another fusing electrode 58 (see FIG. 3) used to fuse the end 26 of the magnet wire 24 to the terminal pin 20 are allowed to contact the pin 20 and thereby form a closed circuit. By arranging the terminal pin 20 such that the diagonal connecting corners 32, 40 is parallel to the core 12 of the bobbin 10 (i.e., transverse of the flange 16), the corners 32, 40 are made more accessible to the electrodes 50, 58.

Figure 3:
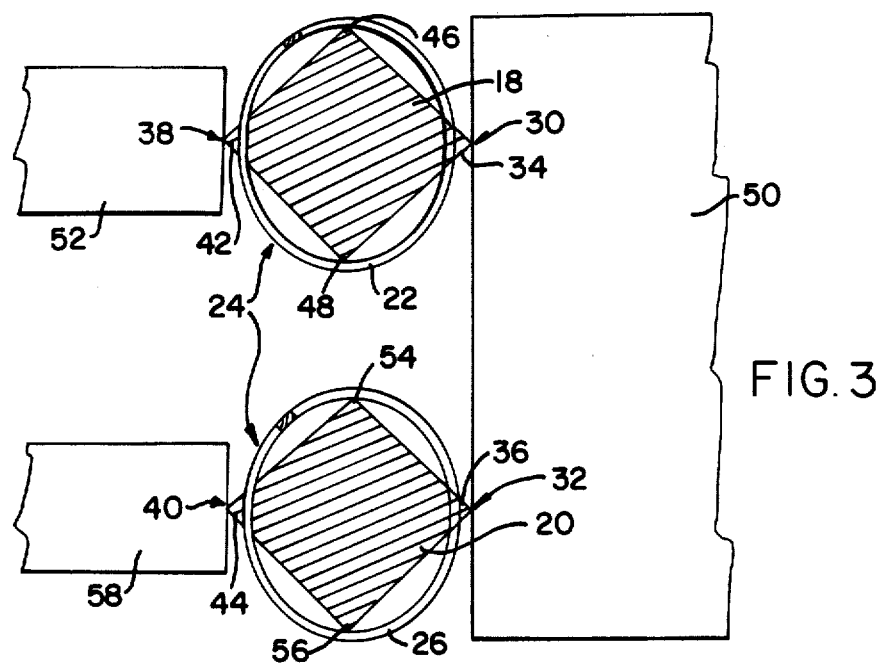
FIG. 3 is a schematic cross-sectional illustration showing a terminal pin constructed in accordance with the present invention being fused to a piece of magnet wire.

In order to fuse the ends 22, 26 of the magnet wire 24 to the terminal pins 18, 20 respectively, the ground electrode 50 and the fusing electrode 52 are moved into contact with the corners 30, 38, respectively, of the terminal pin 18, while the ground electrode 50 and the fusing electrode 58 are moved into contact with the corners 32, 40, respectively, of the terminal pin 20. Because the magnet wire 24 is recessed in the notches 34, 42 of the terminal pin 18 and the notches 36, 44 of the terminal pin 20, the insulation on the magnet wire 24 does not create an open circuit. As shown in FIG. 3, the electrodes 50, 52 and 58 contact the corners of the terminal pins 18 and 20 but do not contact the magnet wire 24. The closed circuit formed by the ground electrode 50, the terminal pin 18 and the fusing electrode 52 generate enough heat to melt the insulation on the end 22 of the magnet wire 24, thereby permitting the end 22 of the magnet wire 24 to be fused to the pin 18. Similarly, the closed circuit formed by the ground electrode 50, the terminal pin 20 and the fusing electrode 58 generate enough heat to melt the insulation on the end 26 of the magnet wire 24, thereby permitting the end 26 of the magnet wire 24 to be fused to the pin 20.

Figure 4:
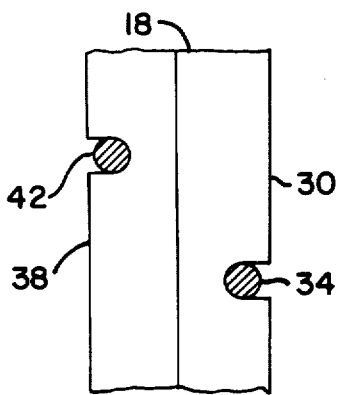
FIG. 4 is a partial elevational view of a terminal pin provided with notches having a first cross-sectional shape.
Figure 5:
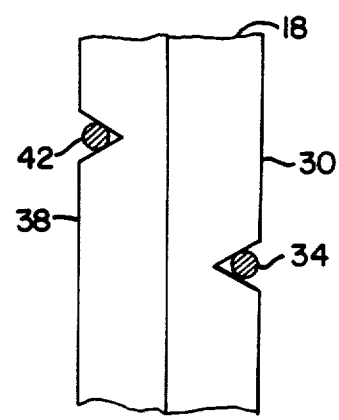
FIG. 5 is a partial elevational view of a terminal pin provided with notches having a second cross-sectional shape.
Figure 6:
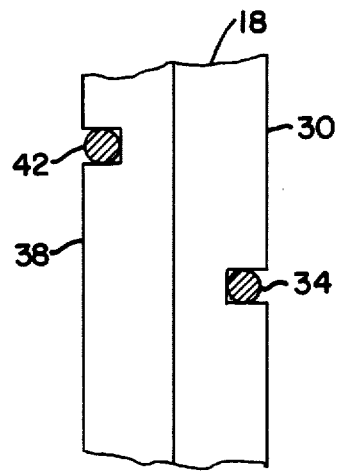
FIG. 6 is a partial elevational view of a terminal pin provided with notches having a third cross-sectional shape.

With reference to FIGS. 4-6, the terminal pin 18 is shown with three different notch configurations. In FIG. 4, the notches 34, 42 in the corners 30, 38 of the terminal pin 18 have a semi-circular shape. As shown in FIG. 5, the notches 34, 42 in the corners 30, 38 of the terminal pin 18 are V-shaped. In FIG. 6, the notches 34, 42 in the corners 30, 38 of the terminal pin 18 have a square shape.

It will be understood that the embodiments described above are merely exemplary and that persons skilled in the art may make many variatons and modifications without departing from the spirit and scope of the invention. All such modifications and variations are intended to be included within the scope of the invention as defined by the appended claims.

What is claimed is:

1. A method of attaching a piece of magnet wire to a terminal pin extending outwardly from a flange of a coil bobbin, said method including the steps of wrapping said piece of magnet wire around the terminal pin in a spiral path, recessing portions of said piece of magnet wire below an outer surface of the terminal pin, applying a pair of elecrodes to the terminal pin in the vicinity of the recessed portions of the piece of magnet wire so that said elecrodes contact said terminal pin but do not contact said piece of magnet wire and passing electric current from one electrode through the terminal pin to the other electrode to thereby fuse said piece of magnet wire to the terminal pin.

2. A method according to claim 1, further comprising the step of providing the terminal pin with a polygonal transverse cross-sectional shape.

3. A method according to claim 2, wherein the portions of the piece of magnet wire are recessed by providing the terminal pin with a first set of notches in one corner thereof and a second set of notches in an opposite corner thereof.

4. A method according to claim 3, wherein said flange is generally planar, the method further comprising the step of arranging the terminal pin such that a line extending between the one corner thereof and the opposite corner thereof is perpendicular to the plane of the flange.

5. A method according to claim 4, wherein the terminal pin has a square transverse cross-sectional shape.

6. A method according to claim 3, wherein each notch of the first and second sets of notches has a round shape.

7. A method according to claim 3, wherein each notch of the first and second sets of notches is V-shaped.

8. A method according to claim 3, wherein each notch of the first and second sets of notches has a square shape.

9. A method according to claim 1, wherein the terminal pin is made from tinned brass.

10. A method as claimed in claim 1, wherein said terminal pin has notches in said outer surface, said step of recessing portions of said piece of magnet wire including the step of positioning said portions of said piece of magnet wire in said notches.

11. A method of attaching a piece of wire to a terminal pin, said method including the steps of wrapping said piece of wire around the terminal pin in a spiral path, recessing portions of said piece of wire below an outer surface of the terminal pin, applying a pair of electrodes to the terminal pin in the vicinity of the recessed portions of the piece of wire so that said electrodes contact said terminal pin but do not contact said piece of magnet wire and passing electric current from one electrode through the terminal pin to the other electrode to thereby fuse the piece of wire to the terminal pin.

12. A method as claimed in claim 11, wherein said terminal pin has notches in said outer surface, said step of recessing portions of said piece of wire including the step of positioning said portions of said piece of wire in said notches.

* * * * *

UNITED STATES PATENT AND TRADEMARK OFFICE
CERTIFICATE OF CORRECTION

PATENT NO. : 4,687,898

DATED : August 18, 1987

INVENTOR(S) : Riordan, et al

It is certified that error appears in the above-identified patent and that said Letters Patent is hereby corrected as shown below:

Column 1, line 41, after "is" insert --deformed, thereby reducing the cross section of the wire. The reduction in its cross section impairs the current carrying capability of the wire. In fact, the current--.

Signed and Sealed this

Fifth Day of July, 1988

Attest:

DONALD J. QUIGG

Attesting Officer

Commissioner of Patents and Trademarks